United States Patent
Kohlhammer et al.

(10) Patent No.: US 6,174,568 B1
(45) Date of Patent: Jan. 16, 2001

(54) SOLVENT-RESISTANT TEXTILE BINDER

(75) Inventors: Klaus Kohlhammer, Marktl; Gerhard Koegler, Hirten; Andreas Lumpp, Burghausen; Monika Rockinger, Simbach am Inn, all of (DE)

(73) Assignee: Wacker-Chemie GmbH, Munich (DE)

( * ) Notice: Under 35 U.S.C. 154(b), the term of this patent shall be extended for 0 days.

(21) Appl. No.: 09/242,034

(22) PCT Filed: Jul. 31, 1997

(86) PCT No.: PCT/EP97/04176

§ 371 Date: May 3, 1999

§ 102(e) Date: May 3, 1999

(87) PCT Pub. No.: WO98/06888

PCT Pub. Date: Feb. 19, 1998

(30) Foreign Application Priority Data

Aug. 8, 1996 (DE) ................................. 196 31 935

(51) Int. Cl.[7] ........................................................ B05D 3/02
(52) U.S. Cl. .................... 427/389.9; 427/392; 427/393.4
(58) Field of Search ................. 427/389.9, 392, 427/393.4

(56) References Cited

U.S. PATENT DOCUMENTS 4,044,197  8/1977  Wiest et al. .

FOREIGN PATENT DOCUMENTS

| 10718/83 | 8/1983 | (AU) . |
|---|---|---|
| 25 12 589 | 9/1976 | (DE) . |
| 44 32 945 A1 | 3/1996 | (DE) . |
| 0 086 889 | 8/1983 | (EP) . |
| 0 261 378 A2 | 3/1988 | (EP) . |
| 0 205 862 B1 | 11/1993 | (EP) . |
| 92/08835 | 5/1992 | (WO) . |
| 96/08597 | 3/1996 | (WO) . |

OTHER PUBLICATIONS

Translation of DE 4432945, Lumpp et al, Mar. 1996.*
Fox T.G., Bull. Am. Physics, Soc. 1, 3, p. 123 (1956).

* cited by examiner

Primary Examiner—Erma Cameron
(74) Attorney, Agent, or Firm—Brooks & Kushman P.C.

(57) ABSTRACT

A textile binder in the form an aqueous copolymer dispersion or of a copolymer powder obtainable by means of free-radical emulsion polymerization of a) one or more monomers from the group consisting of vinyl esters, esters of acrylic acid and methacrylic acid, vinylaromatics, vinyl halides and alpha-olefins and b) from 0.01 to 10% by weight, based on the overall weight of the copolymer, of one or more monomers b1) from the group consisting of the N-(alkoxymethyl) acrylamides and N-(alkoxymethyl)-methacrylamides or one or more monomers b2) from the group consisting of N-methylolacrylamide and N-methylolmethacrylamide, or mixtures b1) and b2), where as emulsifier(s)

from 0.01 to 10% by weight, based on the overall weight of the copolymer, of one or more emulsifiers from the group of the monoesters or diesters of sulfosuccinic acid with linear, unbranched or branched, or cycloaliphatic alcohols, are employed or are added to the aqueous copolymer dispersion after the end of the emulsion polymerization.

12 Claims, No Drawings

SOLVENT-RESISTANT TEXTILE BINDER

TECHNICAL FIELD

The invention relates to solvent-resistant textile binders, to processes for the preparation thereof and to processes for preparing solvent-resistant fiber structures using the solvent-resistant textile binders.

BACKGROUND ART

The use of aqueous copolymer dispersions as binders for bonding and coating fiber structures such as woven fabrics, nonwovens and waddings of textile fiber or textile yarns is known. Copolymer dispersions of (meth)acrylate or vinyl ester copolymers which comprise self-crosslinking comonomer units with N-methylol or N-methylol ether functions to improve their strength are often used here. Up to 10% by weight of N-methylol(meth)acrylamide (NMA or NMMA) are usually copolymerized. Disadvantages of these binders are the release of formaldehyde due to cleavage of the N-methylol function and the low resistance to solvents of the materials bonded or coated with them. Improvement of the resistance to solvents by incorporation of precrosslinking, poly-ethylenically unsaturated comonomer units is known. However, this measure often leads to problems in the preparation of the copolymer dispersions.

Thermally self-crosslinking copolymers which comprise 2 to 10% by weight of N-methylol(meth)acrylamide or the N-methylol ether thereof are known from DE-A 2512589 (U.S. Pat. No. 4,044,197). The copolymer dispersions are prepared in the presence of any desired anionic, cationic or nonionic emulsifiers, anionic and nonionic emulsifiers being preferred. A disadvantage is that, although in the case of the N-methylolacrylamide-containing copolymers used therein the heat-treated copolymer films show a good resistance to solvents, the nonwovens bonded with them do not.

EP-B 205862 relates to textile binders based on vinyl acetate/ethylene copolymers which comprise 1 to 5% by weight of N-methylol(meth)acrylamide units or ethers thereof. To improve the wet strength if a copolymer binder of low NMA content is used, the additional use of melamine-formaldehyde resins is proposed. The polymerization is carried out in the presence of anionic or nonionic emulsifiers.

The doctrine of EP-A 261378 is to improve the heat stability of fiber mats bonded with N-methylol functional styrene/acrylate copolymers by employing as binders those copolymers in which the N-methylol functions are completely or partly etherified. The polymerization can take place in the presence of any desired nonionic or anionic emulsifiers.

WO-A 92/08835 describes textile binders based on vinyl acetate/ethylene copolymer emulsions which comprise exclusively N-(n-butoxymethyl)acrylamide units instead of N-methylol(meth)acrylamide units to reduce the release of formaldehyde. For the preparation according to the emulsion polymerization process, the usual ionic or nonionic emulsifiers can be used.

EP-A 86889 (AU-A 8310718) relates to a process for the preparation of a textile coating composition which shows no white swelling and no white fracture under the action of water. The coating composition comprises an aqueous copolymer emulsion which is obtained by emulsion copolymerization of (meth)acrylates with N-methylol(meth)acrylamide, the N-methylol(meth)acrylamides being etherified to the extent of at least 20 mol % with an alcohol and the emulsion polymerization being carried out in the presence of a mixture of fatty alcohol having 10 to 20 C atoms and fatty alcohol adducts of alkylene oxides or alkylphenols.

In DE-A 4432945 (WO-A 96/08597) it is proposed, for improving the solvent resistance, to employ textile binders with a mixture of N-methylol-functional comonomer units and N-methylol ether-functional comonomer units. By this means a marked improvement in solvent resistance is obtained, although this is still not satisfactory for certain applications, especially in the case of soft textile binders—for example, ethylene-vinyl acetate copolymers of high ethylene content.

SUMMARY OF THE INVENTION

The invention was based on the object of providing a binder based on aqueous copolymer dispersions or copolymer powders having N-methylol-functional and N-methylol ether-functional comonomer units, with which a further increase in the solvent resistance, in addition to a high dry and wet strength, is achieved, especially also in soft textile binders.

DESCRIPTION OF THE PREFERRED EMBODIMENTS

The invention relates to a solvent-resistant textile binder in the form of an aqueous copolymer dispersion or of a copolymer powder of copolymers having a $T_g$ of $-60°$ C. to $+60°$ C., obtainable by means of free-radical emulsion polymerization, in the presence of emulsifier(s) and optionally after drying of the aqueous copolymer dispersion thereby obtained, of a) one or more monomers from the group consisting of vinyl esters of unbranched or branched carboxylic acids having 1 to 12 C atoms, esters of acrylic acid and methacrylic acid with unbranched or branched alcohols having 1 to 12 C atoms, vinylaromatics, vinyl halides and alpha-olefins and b) 0.01 to 10% by weight, based on the total weight of the copolymer, of one or more monomers b1) selected from the group consisting of the N-(alkoxymethyl)acrylamides and N-(alkoxy-methyl)methacrylamides with a $C_1$- to $C_6$-alkyl radical or
one or more monomers b2) from the group N-methylolacrylamide and N-methylolmethacrylamide or
mixtures of N-(alkoxymethyl) compounds b1) and N-methylol compounds b2), characterized in that as emulsifier(s)
from 0.01 to 10% by weight, based on the overall weight of the copolymer, of one or more emulsifiers from the group of the diesters of sulfosuccinic acid with linear, unbranched or branched, or cycloaliphatic alcohols are employed or are added to the aqueous copolymer dispersion after the end of the emulsion polymerization.

Preferred N-(alkoxymethyl)(meth)acrylamides are N-(isobutoxymethyl)acrylamide (IBMA), N-(isobutoxymethyl)methacrylamide (IBMMA), N-(n-butoxymethyl)acrylamide (NBMA) and N-(n-butoxymethyl)methacrylamide (NBMMA).

The copolymers preferably comprise 0.5 to 4.0% by weight, based on the total weight of the copolymer, of monomer units b1) selected from N-(alkoxymethyl)acrylamides or N-(alkoxymethyl)methacrylamides with a $C_1$- to $C_6$-alkyl radical or of monomer units b2) N-methylolacrylamide (NMA) or N-methylolmethacrylamide (NMMA), or of mixtures of monomer units b1) and monomer units b2). Copolymers which comprise, in the weight contents mentioned, mixtures of the N-(alkoxymethyl)(meth)acrylamides with N-methylolacrylamide or N-methylolmethacrylamide in a weight ratio of N-methylol compound to N-(alkoxymethyl) compound of 10:1 to 1:5 are particularly preferred. Copolymers which comprise 0.5 to 3.0% by weight, based on the total weight of the copolymer, of a mixture of NMA and IBMA (IBMMA) in a weight ratio of NMA/IBMA (IBMMA) of 6:1 to 1:3, in particular 6:1 to 1:1, are most preferred.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 9 or 10 C atoms, for example VeoVa9$^R$ or VeoVa10$^R$. Vinyl acetate is particularly preferred.

Preferred methacrylic acid esters or acrylic acid esters are methyl acrylate, methyl methacrylate, ethyl acrylate, ethyl methacrylate, propyl acrylate, propyl methacrylate, n-butyl acrylate, n-butyl methacrylate and 2-ethylhexyl acrylate. Methyl acrylate, methyl methacrylate, n-butyl acrylate and 2-ethylhexyl acrylate are particularly preferred.

The vinyl ester copolymers can comprise, if appropriate, 1.0 to 50% by weight, based on the total weight of the comonomer phase, of alpha-olefins, such as ethylene or propylene, and/or vinylaromatics, such as styrene, and/or vinyl halides, such as vinyl chloride, and/or acrylic acid esters or methacrylic acid esters of alcohols having 1 to 12 C atoms, such as methyl acrylate, methyl methacrylate, ethyl acrylate, ethyl methacrylate, propyl acrylate, propyl methacrylate, n-butyl acrylate, n-butyl methacrylate and 2-ethylhexyl acrylate, and/or ethylenically unsaturated dicarboxylic acid esters or derivatives thereof, such as diisopropyl fumarate and the dimethyl, dibutyl and diethyl esters of maleic acid or fumaric acid, or maleic anhydride. The choice from the monomers mentioned is preferably taken here such that copolymers having a glass transition temperature $T_g$ of −40° C. to +60° C., preferably −30° C. to +35° C., are obtained.

The (meth)acrylic acid ester copolymers can comprise, if appropriate, 1.0 to 50% by weight, based on the total weight of the comonomer phase, of alpha-olefins, such as ethylene or propylene, and/or vinylaromatics, such as styrene, and/or vinyl halides, such as vinyl chloride, and/or ethylenically unsaturated dicarboxylic acid esters or derivatives thereof, such as diisopropyl fumarate and the dimethyl, dibutyl and diethyl esters of maleic acid or fumaric acid, or maleic anhydride. The choice from the monomers mentioned is preferably taken here such that copolymers having a glass transition temperature $T_g$ of −40° C. to +60° C., preferably −30° C. to +35° C., are obtained.

If appropriate, the vinyl ester copolymers and the (meth) acrylic acid ester copolymers also comprise 0.05 to 3.0% by weight, based on the total weight of the comonomer mixture, of one or more auxiliary monomers from the group consisting of ethylenically unsaturated carboxylic acids, preferably acrylic acid or methacrylic acid, from the group consisting of ethylenically unsaturated carboxylic acid amides, preferably acrylamide and 2-acrylamidopropanesulfonic acid, from the group consisting of ethylenically unsaturated sulfonic acids and salts thereof, preferably vinylsulfonic acid, and/or from the group consisting of poly-ethylenically unsaturated comonomers, for example divinyl adipate, 1,9-decadiene, allyl methacrylate and triallyl cyanurate, and crosslinking comonomers, such as acrylamidoglycolic acid (AGA), methacrylamidoglycolic acid methyl ester (MAGME) and polyglycol dimethacrylate.

Preferred vinyl ester copolymers comprise as comonomer units a), in each case based on the total weight of the copolymer:

90 to 99.99% by weight of vinyl ester, in particular vinyl acetate;

49.9 to 89.99% by weight of vinyl ester, in particular vinyl acetate and 10 to 50% by weight of alpha-olefin, in particular ethylene;

50 to 75% by weight of vinyl acetate, 1 to 30% by weight of vinyl ester of an alpha-branched carboxylic acid, in particular having 9 and/or 10 C atoms, and 10 to 40% by weight of ethylene;

70 to 98.99% by weight of vinyl acetate and 1 to 30% by weight of vinyl ester of an alpha-branched carboxylic acid, in particular having 9 and/or 10 C atoms, 70 to 98.99% by weight of vinyl ester, in particular vinyl acetate, and 0.1 to 30% by weight of acrylic acid ester, in particular n-butyl acrylate or 2-ethylhexyl acrylate;

50 to 75% by weight of vinyl acetate, 0.1 to 30% by weight of acrylic acid ester, in particular n-butyl acrylate or 2-ethylhexyl acrylate, and 10 to 40% by weight of ethylene; or 30 to 75% by weight of vinyl acetate, 1 to 30% by weight of vinyl ester of an alpha-branched carboxylic acid, in particular having 9 and/or 10 C atoms, 0.1 to 30% by weight of acrylic acid ester, in particular n-butyl acrylate or 2-ethylhexyl acrylate, and 10 to 40% by weight of ethylene.

Preferred (meth)acrylic acid ester copolymers comprise as comonomer units a), in each case based on the total weight of the copolymer:

90 to 99.99% by weight of n-butyl acrylate and/or 2-ethylhexyl acrylate;

40 to 59.99% by weight of methyl methacrylate and 59.99 to 40% by weight of n-butyl acrylate and/or 2-ethylhexyl acrylate; or 40 to 59.99% by weight of styrene and 59.99 to 40% by weight of n-butyl acrylate and/or 2-ethylhexyl acrylate.

The figures in percent by weight for the stated preferred vinyl ester copolymers and (meth)acrylic ester copolymers in each case add up to 100% by weight.

It is preferred to employ from 0.5 to 5% by weight, based on the overall weight of the copolymer, of one or more emulsifiers from the group of the mono- or diesters of sulfosuccinic acid with linear, unbranched or branched, or cycloaliphatic alcohols. Particular preference is given to the diesters of sulfosuccinic acid with linear, unbranched or branched, or cycloaliphatic alcohols having 4 to 13 carbon atoms. Examples of these are dibutyl-sulfosuccinic diesters, dihexyl-sulfosuccinic diesters, dicyclohexyl-sulfosuccinic diesters, dioctyl-sulfosuccinic diesters, ditridecyl-sulfosuccinic diesters.

The use of the monoesters or diesters of sulfosuccinic acid has a particularly advantageous effect for improving the solvent resistance of the textile binders in the case of soft textile binders—that is, textile binders based on copolymers having a Tg of from −30° C. to +10° C. Examples of such binders are the abovementioned copolymers of vinyl acetate with ethylene, of vinyl acetate and acrylic esters with or without ethylene, copolymers of acrylic esters such as n-butyl acrylate and/or 2-ethylhexyl acrylate. The glass transition temperature Tg of the polymers can be determined in a conventional manner by means of differential scanning calorimetry (DSC). The Tg can also be calculated approximately beforehand by means of the Fox equation. According to Fox T. G., Bull. Am. Physics Soc. 1, 3, page 123 (1956), it holds that: $1/Tg-x_1/Tg_1+x_2/Tg_2+ \ldots +X_n/Tg_n$, where $X_n$ represents the mass fraction (% by weight/100) of the monomers n, and $Tg_n$ is the glass transition temperature, in degrees Kelvin, of the homopolymer of the monomer n. Tg values for homopolymers are set out in Polymer Handbook 2nd Edition, J. Wiley & Sons, New York (1975).

The solvent-resistant textile binder is prepared by the emulsion polymerization process in the aqueous phase. The polymerization can be carried out discontinuously or continuously, with or without the use of seed lattices, with initial introduction of all or individual constituents of the reaction mixture, or with partial initial introduction and subsequent metering-in of the constituents or individual constituents of the reaction mixture, or by the metering process without an initial introduction. All the meterings are preferably effected at the rate of consumption of the particular component. In a preferred embodiment, 10 to 25% by weight of comonomers a) are initially introduced and the remainder is metered in as emulsion together with comonomers b). Copolymerization with ethylene is preferably carried out under a pressure of 10 to 100 bar absolute.

The polymerization is carried out in a temperature range from 40° C. to 80° C. and is initiated using the methods usually employed for emulsion polymerization. The initiation is effected by means of the customary water-soluble agents which form free radicals, which are preferably employed in amounts of 0.01 to 1.0% by weight, based on the total weight of the monomers. Examples of these are ammonium and potassium persulfate, alkyl hydroperoxides, such as tert-butyl hydroperoxide, and hydrogen peroxide. If appropriate, the free radical initiators mentioned can also be combined in a known manner with 0.01 to 0.5% by weight, based on the total weight of the monomers, of reducing agents. Suitable reducing agents are, for example, formaldehyde-sulfoxylate salts, sodium bisulfite or ascorbic acid. In the case of redox initiation, one or both redox catalyst components are preferably metered in during the polymerization.

The addition of the mono- or diesters of sulfosuccinic acid is arbitrary. Preferably, they are metered in during the polymerization, together if desired with water and comonomer.

The mono- or diesters of sulfosuccinic acid can also be employed in a mixture with emulsifiers that are customarily used during the emulsion polymerization. Examples of suitable emulsifiers are anionic surfactants, such as alkyl sulfates having a chain length of 8 to 18 C atoms, alkyl- and alkylaryl ether sulfates having 8 to 18 C atoms in the hydrophobic radical and up to 40 ethylene oxide or propylene oxide units, alkyl- or alkylarylsulfonates having 8 to 18 C atoms. Suitable nonionic surfactants are, for example, nonylphenol, alkyl polyglycol ethers or alkylaryl polyglycol ethers having 8 to 40 ethylene oxide units.

Another possible procedure is to carry out the emulsion polymerization in the presence of said anionic or nonionic surfactants that are customarily used in the course of the emulsion polymerization and to add the mono- or diesters of sulfosuccinic acid, in the stated amounts, only after the polymerization of the polymer dispersion has ended.

If appropriate, protective colloids can be employed, preferably in amounts of up to 4% by weight, based on the total weight of the monomers. Examples of these are vinyl alcohol/vinyl acetate copolymers having a content of 80 to 100 mol % of vinyl alcohol units, polyvinylpyrrolidones having a molecular weight of 5000 to 400,000, and hydroxyethylcelluloses having a degree of substitution in the range from 1.5 to 3.

The pH range desired for the polymerization, which is in general between 3 and 7, can be established in a known manner by acids, bases or customary buffer salts, such as alkali metal phosphates, alkali metal acetates or alkali metal carbonates. To establish the molecular weight, the regulators usually used, for example mercaptans, aldehydes and chlorinated hydrocarbons, can be added during the polymerization.

The solids content of the aqueous dispersions is preferably 30 to 70% by weight.

To prepare the copolymer powders, the dispersion is dried, preferably spray dried or coagulated and then dried in a fluidized bed, or freeze dried, particularly preferably spray dried. The known devices, such as, for example, spraying through multi-component nozzles or with a disc, in a stream of dry gas, which is heated if appropriate, can be used for this procedure. Temperatures above 250° C. are in general not used. The optimum temperature of the dry gas can be determined in a few experiments; temperatures above 60° C. have often proved to be particularly suitable.

To increase the storage stability and, for example in the case of powders of low glass transition temperature $T_g$, to prevent caking and blocking, an antiblocking agent, for example aluminum silicates, kieselguhr or calcium carbonate, is added, if appropriate, during the drying. It is furthermore also possible to add to the dispersion, if appropriate, defoamers, for example based on silicones or hydrocarbons, or spraying aids, for example polyvinyl alcohols or water-soluble melamine-formaldehyde condensation products.

In a preferred embodiment, the copolymer powders also comprise 0 to 30% by weight, particularly preferably 1 to 15% by weight, based on the base polymer, of polyvinyl alcohol having a degree of hydrolysis of 85 to 94 mol %, and/or 0 to 10% by weight of vinyl alcohol copolymers with 5 to 35% by weight of 1-methylvinyl alcohol units, and/or 0 to 30% by weight, particularly preferably 4 to 20% by weight, based on the total weight of polymeric constituents, of antiblocking agent, and, if appropriate, up to 2% by weight, based on the base polymer, of defoamer.

The aqueous copolymer dispersions and the copolymer powders are suitable for finishing and bonding of naturally occurring or synthetic fiber materials. Examples of these are wood fiber, cellulose fiber, wool, cotton, mineral fibers, ceramic fibers and synthetic fibers based on fiber-forming polymers, such as viscose fiber, polyethylene, polypropylene, polyester, polyamide, polyacrylonitrile or carbon fiber, fibers of homo- or copolymers of vinyl chloride or fibers of homo- or copolymers of tetrafluoroethylene. The aqueous copolymer dispersions and the copolymer powders are particularly suitable for finishing and bonding of polyester fiber, polypropylene fiber and cellulose fiber materials.

The invention furthermore relates to a process for the preparation of solvent-resistant fiber structures, where a textile binder in the form of an aqueous copolymer dispersion or a copolymer powder of copolymers having a $T_g$ of from −60° C. to +60° C., obtainable by means of free-radical emulsion polymerization, in the presence of emulsifier(s) and, if desired, with drying of the aqueous copolymer dispersion obtained, of a) one or more monomers from the group consisting of vinyl esters of unbranched or branched carboxylic acids having 1 to 12 C atoms, esters of acrylic acid and methacrylic acid with unbranched or branched alcohols having 1 to 12 C atoms, vinylaromatics, vinyl halides and alpha-olefins and b) 0.01 to 10% by weight, based on the total weight of the copolymer, of one or more monomers b1) from the group consisting of N-(alkoxymethyl)acrylamides and N-(alkoxymethyl)methacrylamides having a $C_1$- to $C_6$-alkyl radical or one or more monomers b2) from the group consisting of N-methylolacrylamide and N-methylolmethacrylamide or mixtures of N-(alkoxymethyl) compounds b1) and N-methylol compounds b2), the emulsifier(s) employed comprising from 0.01 to 10% by weight, based on the overall weight of the copolymer, of one or more emulsifiers from the group of the mono- or diesters of sulfosuccinic acid with linear, unbranched or branched, or cycloaliphatic alcohols, or being added to the aqueous copolymer dispersion after the emulsion polymerization has ended, is applied in an amount of 5 to 50% by weight of binder, based on the fiber weight, to the fiber material spread out in a flat form, and dried at a temperature of 80 to 260° C.

Before the bonding, the fibers are spread out in a flat form. The processes for this are known and depend primarily on the use to which the bonded fiber material is put. The fibers can be laid out by means of an air laying, wet laying, direct spinning or carding device. If appropriate, the flat structures can also be bonded mechanically before the bonding with the binder, for example by cross-laying, needle-punching or water jet bonding.

The aqueous copolymer dispersions are applied in the customary manner by impregnation, foam impregnation, spraying, slop padding, brushing or printing. If appropriate, after removal of excess binder by, for example, squeezing off, the textile structures are dried at temperatures of 80° C. to 260° C., preferably between 120° C. and 200° C. The amount of binder needed for bonding the fiber material is between 5 and 50% by weight of binder, based on the fiber weight, depending on the field of use.

If copolymer powders are used, in a manner known per se the pulverulent binder is sprinkled onto, sprinkled into (for example in the case of carded wadding) or compacted by vibration into the fiber material, which is prebonded mechanically if appropriate, or mixed directly with the fiber. The textile structures are dried at temperatures of 80° C. to 260° C., preferably between 120° C. and 200° C. The amount of binder needed for bonding the fiber material is between 5 and 50% by weight, based on the fiber weight, depending on the field of use.

Pigments, antioxidants, dyestuffs, plasticizers, film-forming auxiliaries, fillers, flameproofing agents, foam formation auxiliaries, foam inhibitors, wetting agents, heat sensitization agents, antistatics, biocides, agents which improve handle, additional crosslinking agents or catalysts for any necessary acceleration of the crosslinking reaction can also be added to the binder according to the invention in the amounts customary for this purpose.

The solvent-resistant textile binder is preferably suitable for bonding non-wovens, for example in the domestic and hygiene sector, and for industrial wiping cloths. Another field of use is non-slip finishing of woven fabrics.

The following examples serve to illustrate the invention further:

Preparation of the Copolymer Dispersions

EXAMPLE 1

A pressure reactor was charged with 5.1 kg of water, 2.5 g of a 5% strength aqueous formic acid solution, 25.7 g of a 25% strength aqueous solution of vinyl sulfonate, 20 g of an ethylene oxide-propylene oxide block copolymer together with 68.4 g of butyl acrylate and 588 g of vinyl acetate. The mixture was heated to 50° C., and ethylene was injected with a pressure of 75 bar. After temperature equilibrium had been reached, 547 g of a 5% strength aqueous solution of ammonium persulfate and 547 g of a 2.5% strength aqueous solution of ascorbic acid were metered in. After the initial charge had polymerized fully, 5880 g of vinyl acetate and 301 g of butyl acrylate were metered in. Together with the metering of vinyl acetate, a mixture of 515 g of water, 305 g of a 48% strength aqueous N-methylolacrylamide solution, 40.2 g of an 85% strength aqueous solution of N-(isobutoxy-methyl)acrylamide and 205 g of dihexyl-sulfosuccinic diester was metered in.

After the end of the polymerization, the result was a dispersion having a solids content of 51.7% by weight of a copolymer with 30.9% by weight of ethylene, 1.4% by weight N-methylolacrylamide and 0.35% by weight (N-isobutoxymethyl)acrylamide.

EXAMPLE 2

A procedure similar to that of Example 1 was followed with the difference that 136.7 g of dihexyl-sulfosuccinic diester were metered in and, in addition, 119.6 g of an isotridecyl ethoxylate having 15 EO units (emulsifier 1) were added, some in the initial charge and some metered in.

After the end of the polymerization the result was a dispersion having a solids content of 51.4% by weight of a copolymer with 32.0% by weight ethylene, 1.4% by weight N-methylolacrylamide and 0.35% by weight (N-isobutoxymethyl)acrylamide.

EXAMPLE 3

A procedure similar to that of Example 1 was followed with the difference that 68.4 g of dihexyl-sulfosuccinic diester were metered in and 188 g of an isotridecyl ethoxylate having 15 EO units (emulsifier 2) were added, some in the initial charge and some metered in.

After the end of the polymerization the result was a dispersion having a solids content of 51.5% by weight of a copolymer with 31.5% by weight ethylene, 1.4% by weight N-methylolacrylamide and 0.35% by weight (N-isobutoxymethyl)acrylamide.

EXAMPLE 4

A procedure similar to that of Example 1 was followed with the difference that 381 g of a 48% strength aqueous N-methylolacrylamide solution but no N-(isobutoxymethyl) acrylamide were metered in.

After the end of the polymerization the result was a dispersion having a solids content of 54.0% of a copolymer of 31.4% by weight ethylene and 1.75% by weight N-methylolacrylamide.

COMPARATIVE EXAMPLE 1

A procedure similar to that of Example 1 was followed with the difference that no dihexyl-sulfosuccinic diester was employed but instead a mixture of 188 g of an isotridecyl ethoxylate having 15 EO units (emulsifier 1) and 51.3 g of a sulfatized alkyl ethoxylate having about 3 EO units (emulsifier 2) was added, some in the initial charge and some metered in.

After the end of the polymerization the result was a dispersion having a solids content of 55.4% of a copolymer of 30.5% by weight ethylene, 1.4% by weight N-methylolacrylamide, 0.35% by weight (N-isobutoxymethyl)acrylamide.

COMPARATIVE EXAMPLE 2

A procedure similar to that of Example 4 was followed with the difference that no dihexyl-sulfosuccinic diester was employed but instead a mixture of 188 g of an isotridecyl ethoxylate having 15 EO units (emulsifier 1) and 51.3 g of a sulfatized alkyl ethoxylate having about 3 EO units (emulsifier 2) was added, some in the initial charge and some metered in.

After the end of the polymerization the result was a dispersion having a solids content of 53.1% of a copolymer of 33.5% by weight ethylene and 1.75% by weight N-methylolacrylamide.

EXAMPLE 5

A procedure similar to that of Example 1 was followed with the difference that polymerization was carried out with an ethylene pressure of 65 bar.

After the end of polymerization the result was a dispersion having a solids content of 52.8% of a copolymer of 22.3% by weight ethylene, 1.6% by weight N-methylolacrylamide and 0.4% by weight (N-isobutoxymethyl)acrylamide.

EXAMPLE 6

A procedure similar to that of Example 5 was followed with the difference that instead of dihexyl-sulfosuccinic diester the same amount of dibutyl-sulfosuccinic diester was employed.

After the end of the polymerization the result was a dispersion having a solids content of 54.0% of a copolymer of 20.6% by weight ethylene, 1.6% by weight N-methylolacrylamide and 0.4% by weight (N-isobutoxymethyl)acrylamide.

EXAMPLE 7

A procedure similar to that of Example 5 was followed with the difference that instead of dihexyl-sulfosuccinic diester the same amount of dioctyl-sulfosuccinic diester was employed.

After the end of the polymerization the result was a dispersion having a solids content of 54.0% of a copolymer of 22.2% by weight ethylene, 1.6% by weight N-methylolacrylamide and 0.4% by weight (N-isobutoxymethyl)acrylamide.

EXAMPLE 8

A procedure similar to that of Example 5 was followed with the difference that instead of dihexyl-sulfosuccinic diester the same amount of dicyclohexyl-sulfosuccinic diester was employed.

After the end of the polymerization the result was a dispersion having a solids content of 54.0% of a copolymer of 20.6% by weight ethylene, 1.6% by weight N-methylolacrylamide and 0.4% by weight (N-isobutoxymethyl)acrylamide.

EXAMPLE 9

A procedure similar to that of Example 5 was followed with the difference that instead of dihexyl-sulfosuccinic diester the same amount of ditridecyl-sulfosuccinic diester was employed.

After the end of the polymerization the result was a dispersion having a solids content of 54.0% of a copolymer of 23.3% by weight ethylene, 1.6% by weight N-methylolacrylamide and 0.4% by weight (N-isobutoxymethyl)acrylamide.

Use Tests

Production of the Nonwovens

To produce the nonwovens, a viscose staple fiber nonwoven was bonded with 30% by weight of copolymer dispersion (solids, based on the fiber) by means of full bath impregnation. The excess binder was squeezed off between two rolls and the nonwoven was dried in a drum drier at 150° C. for 3 minutes.

Determination of the Strength of the Nonwovens in Accordance With DIN 53857

The dry strength, wet strength and resistance to solvents of the nonwovens was determined by means of measurement of the maximum tensile force (MTF) of strips of nonwoven with a width of 1.5 cm and a length of 15 cm.

Before the measurement, the nonwovens were kept in a standard climate at T=23° C. and 50% relative atmospheric humidity (DIN 50014) for at least 24 hours.

To determine the wet strength, the nonwovens were kept in water for 1 minute immediately before the measurement. To determine the resistance to solvents, the nonwovens were kept in isopropanol for 1 minute immediately before the measurement.

The maximum tensile force was measured with a Zwick tensile tester, the tensile measurement being carried out at a constant rate of elongation of 100 mm/minute. For each measurement, the maximum tensile force is determined and the measurement is ended when the force has fallen to 40% of the maximum tensile force. In each case 3 strips of nonwoven per specimen were clamped jointly. The mean of 3 measurement series was determined.

The results of the measurements for Examples 1 to 4 and Comparative Examples 1 and 2 are summarized in Table 1:

Table 1 shows that when using succinates better results are obtained than when using other emulsifiers (comparison of Example 3 with Comparative Example 1). As the proportion of succinate increases there is an increase in solvent resistance (comparison of Example 3 with Examples 2 and 1). The comparison of Example 4 with Comparative Example 2 shows that the action of succinates is notable even with binders containing only NMA.

The results of the measurements for Examples 5 to 9 are summarized in Table 2.

The comparison of Examples 6 to 9 shows that as the chain length increases the solvent resistance-enhancing effect of the sulfosuccinate diesters increases. This is all the more surprising since it was to have been expected that as the chain length increased not only the hydrophobic character but also the sensitivity to solvent should have increased.

The comparison of Examples 5 to 9 with Comparative Example 3 shows that the solvent resistance-enhancing effect occurs only with sulfosuccinate diesters. With monosuccinates there is no improvement in the solvent resistance. The solvent resistance of Comparative Example 3 lay within the range of the disuccinate-free batch (Comparative Example 2).

TABLE 1

| Example | NMA (% by wt.) | IBMA (% by wt.) | Succinate (% by wt.) | Emulsifier 1 (% by wt.) | Emulsifier 2 (% by wt.) | MTF dry (N) | MTF wet (NT) | MTF iso-propanol (N) |
|---|---|---|---|---|---|---|---|---|
| 1 | 1.4 | 0.35 | 2.1 | 0.0 | 0.0 | 17.6 | 9.9 | 8.2 |
| 2 | 1.4 | 0.35 | 1.4 | 1.25 | 0.0 | 18.0 | 10.0 | 8.0 |
| 3 | 1.4 | 0.35 | 0.7 | 1.9 | 0.0 | 17.3 | 9.5 | 7.9 |
| 4 | 1.75 | 0.0 | 2.1 | 0.0 | 0.0 | 17.3 | 9.5 | 6.8 |
| Comp. Ex. 1 | 1.4 | 0.35 | 0.0 | 1.9 | 0.5 | 17.1 | 9.5 | 7.4 |
| Comp. Ex. 2 | 1.75 | 0.0 | 0.0 | 1.9 | 0.5 | 17.0 | 9.5 | 5.9 |

TABLE 2

| Example | NMA (% by wt.) | IBMA (% by wt.) | Succinate (% by wt.) | Emulsifier 1 (% by wt.) | Emulsifier 2 (% by wt.) | MTF dry (N) | MTF wet (NT) | MTF iso-propanol (N) |
|---|---|---|---|---|---|---|---|---|
| 5 | 1.6 | 0.4 | 2.4 ($C_6$) | 0.0 | 0.0 | 22.2 | 10.3 | 10.1 |
| 6 | 1.6 | 0.4 | 2.4 ($C_4$) | 0.0 | 0.0 | 18.2 | 9.2 | 7.3 |
| 7 | 1.6 | 0.4 | 2.4 ($C_8$) | 0.0 | 0.0 | 17.4 | 8.8 | 8.2 |
| 8 | 1.6 | 0.4 | 2.4 ($cC_6$) | 0.0 | 0.0 | 19.5 | 9.5 | 7.8 |
| 9 | 1.6 | 0.4 | 2.4 ($C_{13}$) | 0.0 | 0.0 | 17.0 | 8.8 | 9.2 |

What is claimed is:

1. A process for the preparation of a solvent-resistant textile binder, comprising polymerizing by free-radical emulsion polymerization in the presence of emulsifier(s), and optionally drying the aqueous copolymer dispersion thereby obtained, wherein as monomers are employed
   a) one or more monomers selected from the group consisting of vinyl esters of unbranched or branched carboxylic acids having 1 to 12 C atoms, esters of acrylic acid or methacrylic acid with unbranched or branched alcohols having 1 to 12 C atoms, vinylaromatics, vinyl halides and alpha-olefins, and
   b) 0.01 to 10% by weight, based on the total weight of the copolymer, of one or more monomers b1) selected from the group consisting of the N-($C_{1-6}$ alkoxymethyl) acrylamides and N-($C_{1-6}$ alkoxymethyl) methacrylamides, or one or more monomers b2) selected from the group consisting of N-methylolacrylamide and N-methylolmethacrylamide, or
   mixtures of compounds b1) and compounds b2),
wherein as emulsifier(s) are employed
   c) from 0.01 to 10% by weight, based on the overall weight of the copolymer, of one or more emulsifiers selected from the group consisting of the sulfosuccinic acid mono- and diesters, the ester groups of said sulfosuccinic acid mono- or diesters derived from $C_{4-13}$ linear, branched, or cyclic aliphatic alcohols,
      said emulsifier c) being added during one or more of the stages prior to, during, or following polymerization of a) and b).

2. The process of claim 1 wherein mixtures of b1) and b2) are copolymerized as monomers (b).

3. A solvent-resistant textile binder comprising a copolymer or aqueous dispersion thereof, said copolymer having a $T_g$ of −60° C. to +60° C., and obtained by the emulsion polymerization of
   a) one or more monomers selected from the group consisting of vinyl esters of unbranched or branched carboxylic acids having 1 to 12 C atoms, esters of acrylic acid or methacrylic acid with unbranched or branched alcohols having 1 to 12 C atoms, vinylaromatics, vinyl halides and alpha-olefins, and
   b) 0.01 to 10% by weight, based on the total weight of the copolymer, of one or more monomers b1) selected from the group consisting of the N-($C_{1-6}$ alkoxymethyl) acrylamides and N-($C_{1-6}$ alkoxymethyl) methacrylamides, or one or more monomers b2) selected from the group consisting of N-methylolacrylamide and N-methylolmethacrylamide or mixtures of compounds b1) and compounds b2),
wherein as emulsifier(s) are employed
   c) from 0.01 to 10% by weight, based on the overall weight of the copolymer, of one or more sulfosuccinic acid mono- or diesters, the ester groups of said sulfosuccinic acid mono- or diesters derived from $C_{4-13}$ linear, branched, or cyclic aliphatic alcohols
      said emulsifier c) being added during one or more of the stages prior to, during, or following polymerization of a) and b).

4. A process for the preparation of a solvent-resistant fiber structure, in which a solvent-resistant textile binder as claimed in claim 3, in an amount of 5 to 50% by weight based on the fiber weight, is applied to a fiber material spread out in a flat form, and dried at a temperature of 80° C. to 260° C.

5. A process for binding non-wovens, comprising applying to said non-wovens the solvent-resistant textile binder of claim 3 and drying said non-wovens at a temperature of 80° C. to 260° C.

6. A process for rendering a textile material resistant to slippage, comprising applying to said textile material the solvent-resistant textile binder of claim 3 and drying said textile material at a temperature of 80° C. to 260° C.

7. The solvent resistant textile binder of claim 3 where no monomers b1) are used.

8. The solvent-resistant textile binder as claimed in claim 3, wherein mixtures of N-(alkoxymethyl)acrylamides or N-(alkoxymethyl)-methacrylamides having a $C_1$- to $C_6$-alkyl radical with N-methylolacrylamide or N-methylolmethacrylamide are copolymerized as monomers (b).

9. A process for the preparation of a solvent-resistant fiber structure, in which a solvent-resistant textile binder as claimed in claim 8, in an amount of 5 to 50% by weight, based on the fiber weight, is applied to a fiber material spread out in a flat form, and dried at a temperature of 80° C. to 260° C.

10. A process for binding non-wovens, comprising applying to said non-wovens the solvent-resistant binder of claim 8 and drying said non-wovens at a temperature of 80° C. to 260° C.

11. A process for rendering a textile material resistant to slippage, comprising applying to said textile material the solvent-resistant binder of claim 8 and drying said textile material at a temperature of 80° C. to 260° C.

12. A solvent-resistant textile binder comprising a copolymer or aqueous dispersion thereof, said copolymer having a Tg of −60° C. to +60° C., and obtained by the emulsion polymerization, in the presence of emulsifier(s), of
   a) one or more monomers selected from the group consisting of vinyl esters of unbranched or branched carboxylic acids having 1 to 12 C atoms, esters of acrylic acid or methacrylic acid with unbranched or branched alcohols having 1 to 12 C atoms, vinylaromatics, vinyl halides and alpha-olefins, and
   b) 0.01 to 10% by weight, based on the weight of the copolymer, of N-methylol(meth)acrylamide, optionally further containing as part of said 0.01 to 10% by weight, one or more N-($C_{1-6}$ alkoxymethyl)(meth)acrylamide(s), wherein as emulsifier(s) are used
   c) from 0.01 to 10% by weight, based on the overall weight of the copolymer, of one or more sulfosuccinic acid mono- or diesters, the ester groups of said sulfosuccinic acid mono- or diesters derived from $C_{4-13}$ linear, branched, or cyclic aliphatic alcohols,
   said emulsifier c) being added during one or more of the stages prior to, during, or following polymerization of a) and b).

* * * * *